(12) United States Patent
Sun et al.

(10) Patent No.: US 11,044,419 B2
(45) Date of Patent: Jun. 22, 2021

(54) IMAGE PROCESSING DEVICE, IMAGING PROCESSING METHOD, AND PROGRAM

(71) Applicant: Sony Corporation, Tokyo (JP)

(72) Inventors: Legong Sun, Tokyo (JP); Kouji Yamamoto, Kanagawa (JP); Masafumi Wakazono, Tokyo (JP); Yoichiro Sato, Tokyo (JP); Kazuhiro Shimauchi, Tokyo (JP)

(73) Assignee: Sony Corporation, Tokyo (JP)

( * ) Notice: Subject to any disclaimer, the term of this patent is extended or adjusted under 35 U.S.C. 154(b) by 59 days.

(21) Appl. No.: 16/183,122

(22) Filed: Nov. 7, 2018

(65) Prior Publication Data

US 2019/0075249 A1 Mar. 7, 2019

Related U.S. Application Data

(63) Continuation of application No. 15/318,477, filed as application No. PCT/JP2015/062301 on Apr. 22, 2015, now Pat. No. 10,148,894.

(30) Foreign Application Priority Data

Jul. 2, 2014 (JP) .................................. 2014-136698

(51) Int. Cl.
*H04N 5/262* (2006.01)
*H04N 5/225* (2006.01)
(Continued)

(52) U.S. Cl.
CPC .......... *H04N 5/2621* (2013.01); *G06T 5/002* (2013.01); *H04N 5/225* (2013.01); *H04N 5/23293* (2013.01)

(58) Field of Classification Search
CPC ............. H04N 5/2621; H04N 5/23293; H04N 5/23248; H04N 5/23258; H04N 5/23264; G06T 5/002; G03B 5/00; G03B 2205/0007
See application file for complete search history.

(56) References Cited

U.S. PATENT DOCUMENTS 3,867,011 A * 2/1975 Burns .................. G02B 27/646
359/896
5,623,305 A 4/1997 Ishizuka et al.
(Continued)

FOREIGN PATENT DOCUMENTS

EP 2648073 A2 10/2013
EP 2-685-313 A1 1/2014
(Continued)

OTHER PUBLICATIONS

Extended European Search Report dated Jan. 26, 2018, for corresponding European Patent Application No. 15 814 923.7.
(Continued)

*Primary Examiner* — Pritham D Prabhakher
(74) *Attorney, Agent, or Firm* — Michael Best & Friedrich LLP

(57) ABSTRACT

[Object] To reproduce an image to which an effect desired by a user is added.

[Solution] There is provided an image processing device including: an image reverse stabilization processing unit configured to add an effect of expressing shaking to an image on the basis of shaking information on shaking of the image. In addition, there is provided an image processing device including: an image reverse stabilization processing unit configured to decide a degree of an effect of expressing
(Continued)

shaking to be added to an image, on the basis of an expectation value of an immersed feeling of an observer with respect to the image.

16 Claims, 15 Drawing Sheets

(51) Int. Cl.
*G06T 5/00* (2006.01)
*H04N 5/232* (2006.01)

(56) References Cited

U.S. PATENT DOCUMENTS

| | | | | |
|---|---|---|---|---|
| 5,842,054 A * | 11/1998 | Suzuki | ............... | G03B 17/00 396/55 |
| 7,119,831 B2 * | 10/2006 | Ohto | ............... | G06T 19/006 348/135 |
| 7,489,341 B2 * | 2/2009 | Yang | ............... | H04N 19/53 348/208.4 |
| 7,768,551 B2 * | 8/2010 | Yang | ............... | H04N 19/521 348/208.99 |
| 7,791,642 B2 * | 9/2010 | Nishino | ............... | H04N 5/23248 348/208.13 |
| 8,134,603 B2 * | 3/2012 | Auberger | ............... | H04N 5/23248 348/208.3 |
| 8,593,530 B2 * | 11/2013 | Watanabe | ............... | G09G 5/00 348/208.4 |
| 8,605,161 B2 * | 12/2013 | Williams | ............... | H04N 5/23264 348/208.99 |
| 9,001,223 B2 | 4/2015 | Schmit et al. | | |
| 9,143,685 B2 * | 9/2015 | Ogawa | ............... | H04N 5/23254 |
| 9,232,138 B1 * | 1/2016 | Baldwin | ............... | H04N 5/2328 |
| 9,258,484 B2 * | 2/2016 | Tsubaki | ............... | H04N 5/3572 |
| 9,460,493 B2 * | 10/2016 | Suri | ............... | G06T 5/009 |
| 9,635,257 B2 | 4/2017 | Tisch et al. | | |
| 9,824,426 B2 * | 11/2017 | Wu | ............... | G06T 5/002 |
| 2003/0160867 A1 | 8/2003 | Ohto et al. | | |
| 2006/0133506 A1 | 6/2006 | Dang | | |
| 2006/0158524 A1 * | 7/2006 | Yang | ............... | H04N 19/53 348/208.6 |
| 2006/0269155 A1 | 11/2006 | Tener et al. | | |
| 2006/0291841 A1 | 12/2006 | Fukumoto et al. | | |
| 2007/0097232 A1 | 5/2007 | Goris et al. | | |
| 2007/0132856 A1 | 6/2007 | Saito et al. | | |
| 2008/0049831 A1 | 2/2008 | Kokubo et al. | | |
| 2008/0170125 A1 * | 7/2008 | Yang | ............... | H04N 19/53 348/208.4 |
| 2009/0079842 A1 * | 3/2009 | Wilson | ............... | H04N 5/23248 348/222.1 |
| 2009/0225174 A1 * | 9/2009 | Handa | ............... | H04N 5/23267 348/208.3 |
| 2009/0295948 A1 | 12/2009 | Oishi | | |
| 2010/0123787 A1 | 5/2010 | Yamanaka | | |
| 2010/0253700 A1 | 10/2010 | Bergeron | | |
| 2010/0253793 A1 * | 10/2010 | Auberger | ............... | H04N 5/23264 348/208.4 |
| 2010/0254453 A1 | 10/2010 | Dane et al. | | |
| 2011/0025901 A1 | 2/2011 | Tsubusaki | | |
| 2011/0234826 A1 | 9/2011 | Nguyen et al. | | |
| 2011/0298937 A1 * | 12/2011 | Ogawa | ............... | H04N 5/23267 348/208.4 |
| 2012/0069204 A1 | 3/2012 | Shimizu et al. | | |
| 2012/0159996 A1 * | 6/2012 | Sutton | ............... | G03B 17/00 65/406 |
| 2012/0236166 A1 | 9/2012 | Yumiki | | |
| 2012/0242882 A1 * | 9/2012 | Sutton | ............... | H01L 27/14605 348/340 |
| 2013/0033612 A1 * | 2/2013 | Wu | ............... | G06T 5/002 348/208.6 |
| 2013/0076920 A1 | 3/2013 | Schmit et al. | | |
| 2013/0235220 A1 * | 9/2013 | Williams | ............... | H04N 5/23264 348/208.1 |
| 2013/0322766 A1 | 12/2013 | Alpert et al. | | |
| 2014/0178049 A1 | 6/2014 | Kihara et al. | | |
| 2014/0267809 A1 * | 9/2014 | Tsubaki | ............... | H04N 5/23287 348/208.6 |
| 2015/0009345 A1 * | 1/2015 | Tsubaki | ............... | H04N 5/3572 348/208.2 |
| 2015/0189140 A1 * | 7/2015 | Sutton | ............... | H04N 5/2257 348/208.1 |
| 2015/0326748 A1 | 11/2015 | Tisch et al. | | |
| 2015/0363919 A1 * | 12/2015 | Suri | ............... | G06T 5/40 382/172 |

FOREIGN PATENT DOCUMENTS

| | | |
|---|---|---|
| JP | 06-003726 A | 1/1994 |
| JP | 2002-044623 A | 2/2002 |
| JP | 2006-319541 A | 11/2006 |
| JP | 2009-272890 A | 11/2009 |
| JP | 2011-234238 A | 11/2011 |

OTHER PUBLICATIONS

European Patent Office communication Pursuant to Article 94(3) dated Feb. 27, 2020 for corresponding European Application No. 15814923.7.

European Patent Office Communication Pursuant to Article 94 (3) dated Nov. 30, 2018 for corresponding European Application No. 15814923.7.

Chinese Office Action dated Mar. 26, 2019 for corresponding Chinese Application No. 201580034847.4.

* cited by examiner

IMAGE PROCESSING DEVICE, IMAGING PROCESSING METHOD, AND PROGRAM

The present application is a Continuation of application Ser. No. 15/318,477, filed Dec. 13, 2016, which is a National Stage Entry of PCT/JP2015/062301, filed Apr. 22, 2015, and claims priority to Japanese Patent Application JP 2014-136698 filed in the Japanese Patent Office on Jul. 2, 2014, the entire contents of which is hereby incorporated by reference.

TECHNICAL FIELD

The present disclosure relates to an image processing device, an image processing method, and a program.

BACKGROUND ART

Camera shaking correction technology for digital cameras and the like has been already common as described, for example, in Patent Literature 1. A known example of the camera shaking correction technology is an optical technique of detecting camera shaking with a gyro-sensor mounted on an image shooting device, and then driving a correction lens to move the optical axis in such a direction that cancels the camera shaking. An electronic camera shaking correction technique is also known which detects the camera shaking in a shot image, and then cuts out areas for uniform object areas.

CITATION LIST

Patent Literature

Patent Literature 1: JP 2009-272890A

DISCLOSURE OF INVENTION

Technical Problem

The above-described camera shaking correction technology makes it possible to record a stable image even when an image is shot in an environment in which the image shooting device is shaken. Meanwhile, an image subjected to camera shaking correction could possibly fail to sufficiently reproduce a sense of realism felt at the time of image shooting. The above-described technology can select whether to correct camera shaking at the time of image shooting, but it is difficult to change the selection about whether to apply camera shaking correction after an image is shot and recorded. It is not possible to sufficiently reproduce the stableness or a sense of realism as a user desires when the image is reproduced.

Accordingly, the present disclosure proposes a novel and improved image processing device, image processing method, and program that can reproduce an image to which an effect desired by a user is added.

Solution to Problem

According to the present disclosure, there is provided an image processing device including: an image reverse stabilization processing unit configured to add an effect of expressing shaking to an image on the basis of shaking information on shaking of the image.

In addition, according to the present disclosure, there is provided an image processing device including: an image reverse stabilization processing unit configured to decide a degree of an effect of expressing shaking to be added to an image, on the basis of an expectation value of an immersed feeling of an observer with respect to the image.

In addition, according to the present disclosure, there is provided an image processing method including: adding, by a processor, an effect of expressing shaking to an image on the basis of shaking information on shaking of the image.

According to the present disclosure, there is provided an image processing method including: deciding, by a processor, a degree of an effect of expressing shaking to be added to an image, on the basis of an expectation value of an immersed feeling of an observer with respect to the image.

In addition, according to the present disclosure, there is provided a program for causing a computer to execute: a function of adding an effect of expressing shaking to an image on the basis of shaking information on shaking of the image.

In addition, according to the present disclosure, there is provided a program for causing a computer to execute: a function of deciding a degree of an effect of expressing shaking to be added to an image, on the basis of an expectation value of an immersed feeling of an observer with respect to the image.

Advantageous Effects of Invention

According to the present disclosure as described above, it is possible to reproduce an image to which an effect desired by a user is added.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
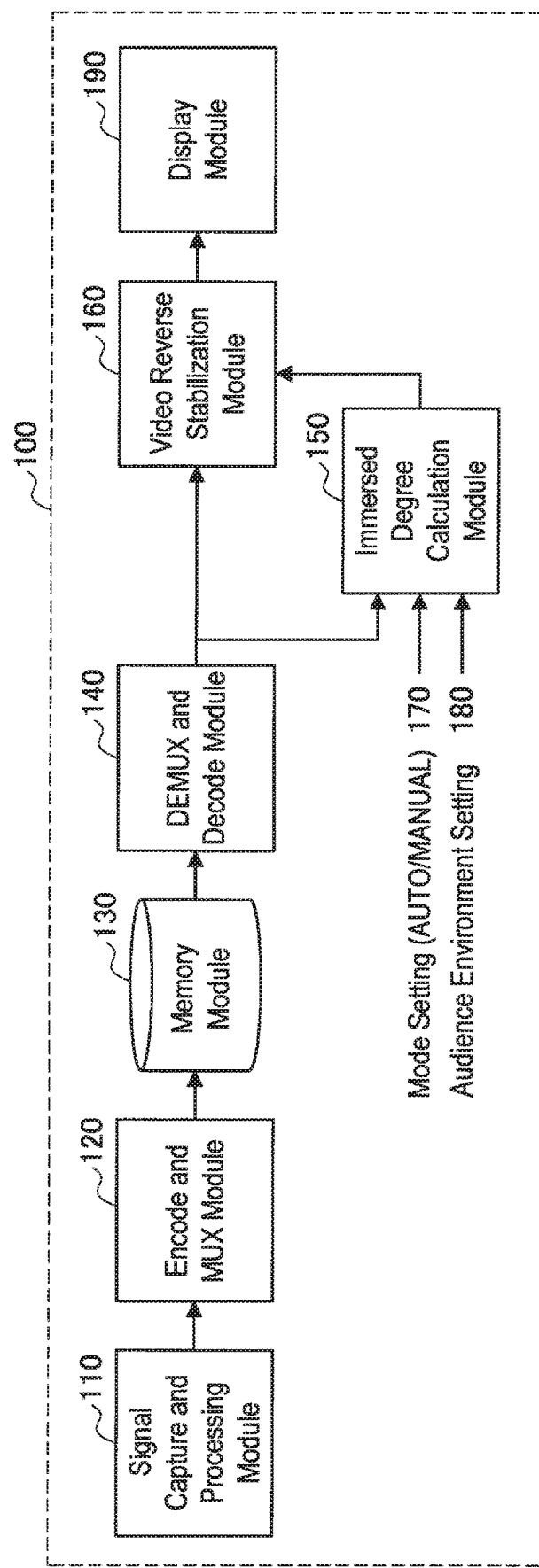
FIG. 1 is a schematic block diagram illustrating a functional configuration example of an image processing system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be now made in the following order.
1. First Embodiment
1-1. Functional configuration
1-2. Processing flow
1-3. Detailed functional configuration of each unit
1-4. Processing of calculating immersed degree
1-5. Display example
2. Second Embodiment
3. Third Embodiment
4. Hardware configuration
5. Supplemental information 1. First Embodiment (1-1. Functional Configuration)

FIG. 1 is a schematic block diagram illustrating the functional configuration example of an image processing system according to a first embodiment of the present disclosure. FIG. 1 illustrates that an image processing system 100 includes a signal capture and processing module 110, an encode and multiplexer module 120, a memory module 130, a demultiplexer and decode module 140, an immersed degree calculation module 150, an image reverse stabilization module 160, and a display module 190. The immersed degree calculation module 150 receives mode setting 170 and audience environment setting 180. Each component will be discussed below in detail.

The functional configuration of the above-described image processing system 100 may be implemented, for example, by a single image processing device or may be dispersively implemented by a plurality of image processing devices. For example, the overall functional configuration of the above-described image processing system 100 may be implemented in a terminal device such as a digital camera or a smartphone or tablet equipped with a camera. In this case, an image shot by a terminal device and subjected to reverse stabilization processing can be viewed on the terminal device itself. The memory module 130 may be built in a terminal device or may be a removable recording medium.

Meanwhile, for example, the functional configuration of the image processing system 100 may be dispersively implemented by a terminal device and a server device. In this case, for example, the signal capture and processing module 110 and the display module 190 may be implemented in a terminal device, and the functional configuration in between, that is, the encode and multiplexer module 120, the memory module 130, the demultiplexer and decode module 140, the immersed degree calculation module 150, and the image reverse stabilization module 160 may be implemented by one or more server devices. The communication between the terminal device and a server device, and the communication between the server devices are performed via a variety of wired or wireless networks including the Internet, Wi-Fi, and Bluetooth (registered trademark).

Some of the encode and multiplexer module 120, the memory module 130, the demultiplexer and decode module 140, the immersed degree calculation module 150, and the image reverse stabilization module 160 may be implemented in terminal devices. In this case, a terminal device that implements the signal capture and processing module 110 is different from a terminal device that implements the display module 190. For example, the signal capture and processing module 110 is implemented in a digital camera, and the display module 190 may be implemented in a personal computer different from the digital camera.

(1-2. Processing Flow)

Figure 2:
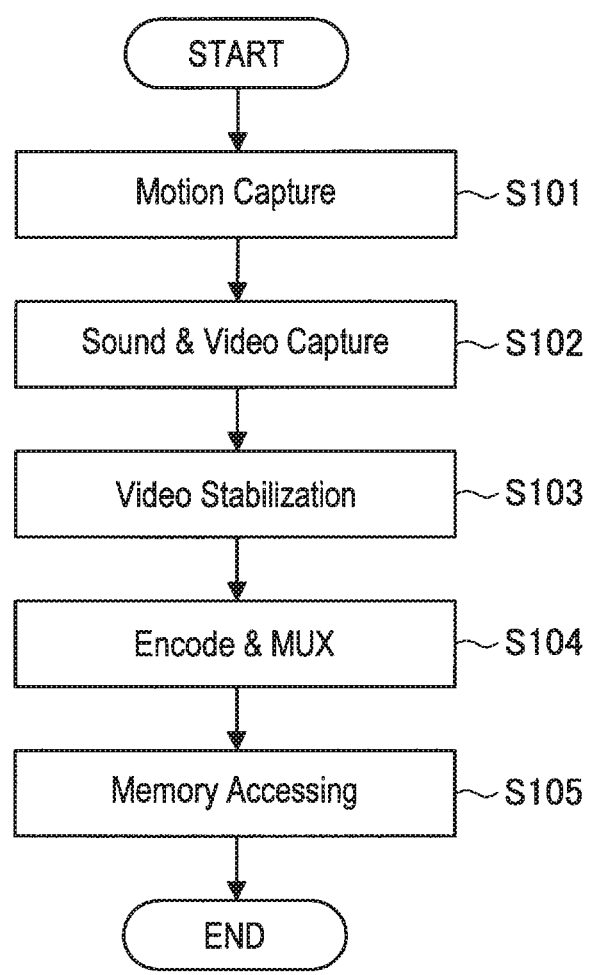
FIG. 2 is a flowchart illustrating an example of recording processing in the first embodiment of the present disclosure.

FIG. 2 is a flowchart illustrating an example of recording processing in the first embodiment of the present disclosure. FIG. 2 illustrates that the signal capture and processing module 110 first captures the motion of an image shooting device (S101), and captures an audio and an image (S102). Furthermore, the signal capture and processing module 110 stabilizes the image in accordance with the motion acquired in S101 (S103), and the encode and multiplexer module 120 encodes and multiplexes the audio and the image (S104). Memory accessing (S105) then causes the data of the audio and image to be stored in the memory module 130.

Here, in the present embodiment, the vector indicating the movement amount of a frame image in the image stabilization in S103 is encoded and multiplexed along with the data of the stabilized image (S104), and stored in the memory module 130 (S105). The vector is used in the processing at the time of reproduction discussed below.

Figure 3:
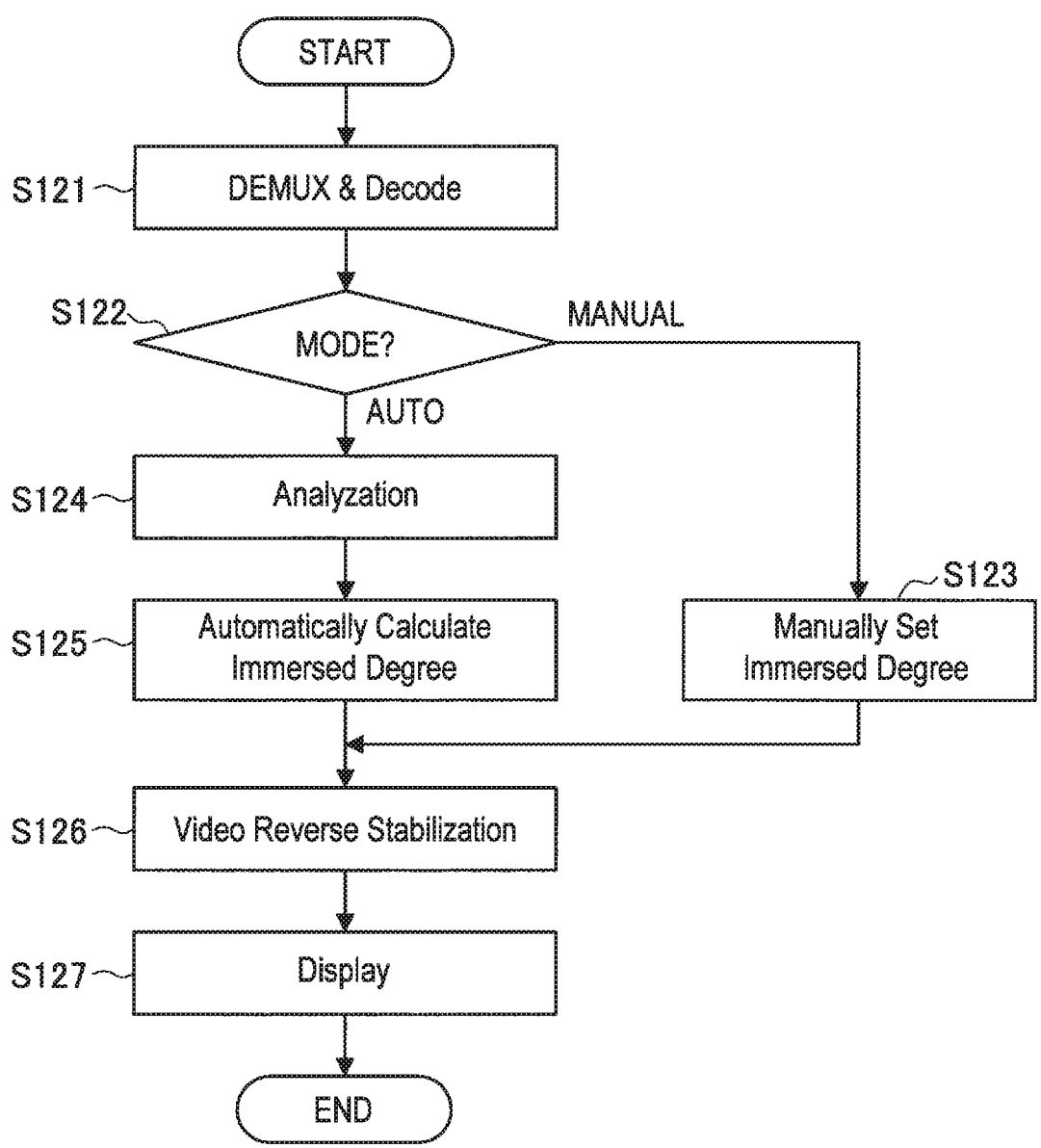
FIG. 3 is a flowchart illustrating an example of reproduction processing in the first embodiment of the present disclosure.

FIG. 3 is a flowchart illustrating an example of reproduction processing in the first embodiment of the present disclosure. FIG. 3 illustrates that the demultiplexer and decode module 140 first demultiplexes and decodes the data of the image and audio read out from the memory module 130 (S121). At this time, the data of the stabilization vector stored in the memory module 130 along with the data of the image and audio is read out, and decoded and demultiplexed.

Next, the immersed degree suitable for the display of an image to be reproduced is decided before reverse stabilization. The definition of the immersed degree will be discussed below. The immersed degree calculation module 150 determines a mode on the basis of the mode setting 170 (S122).

If the mode is "manual," the immersed degree calculation module 150 manually sets the immersed degree (S123). The value of the immersed degree set here can be, for example, a value input through a user operation. Meanwhile, if the determination in S122 shows that the mode is "auto," the immersed degree calculation module 150 analyzes the image (S124) and automatically calculates the immersed degree (S125).

The image reverse stabilization module 160 reverse stabilizes the image on the basis of the immersed degree automatically calculated by the immersed degree calculation module 150 in S125 or the immersed degree manually set by the immersed degree calculation module 150 in S123 (S126). Furthermore, the display module 190 displays the reverse stabilized image (S127).

(1-3. Detailed Functional Configuration of Each Unit)

Figure 4:
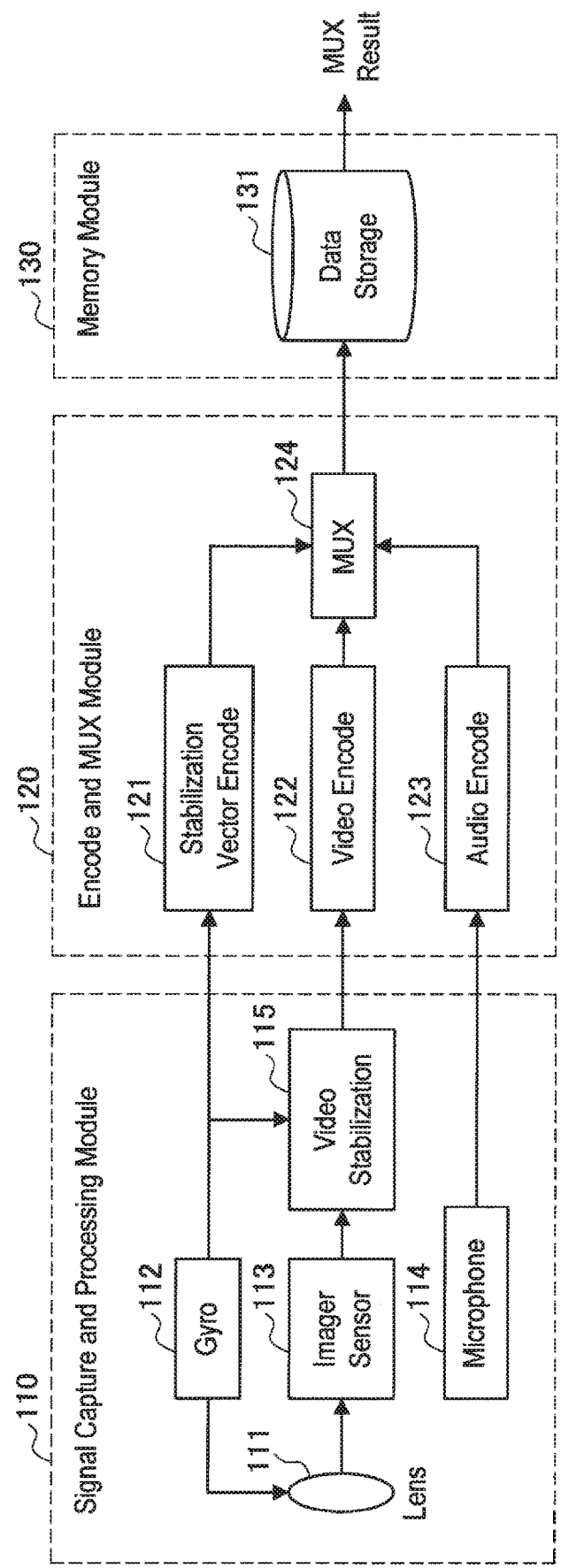
FIG. 4 is a block diagram illustrating a functional configuration for executing recording processing in the image processing system according to the first embodiment of the present disclosure in more detail.

FIG. 4 is a block diagram illustrating the functional configuration for executing recording processing in the image processing system according to the first embodiment of the present disclosure in more detail. The configurations of the signal capture and processing module 110 and the encode and multiplexer module 120 will be chiefly described below in more detail with reference to FIG. 4.

The signal capture and processing module 110 includes a lens 111, a gyro-sensor 112, an imager sensor 113, a microphone 114, and an image stabilization processing unit 115. The imager sensor 113 receives the light through the lens 111, and generates image data. The gyro-sensor 112 detects the vibration of the housing including the lens 111. Shifting a correction lens included in the lens 111 in accordance with the vibration detected by the gyro-sensor 112 achieves optical camera shaking correction (image stabilization) of moving the optical axis in such a direction that cancels the shaking. Although not illustrated, optical camera shaking correction may be achieved by shifting the imager sensor 113.

The image stabilization processing unit 115 applies electronic camera shaking correction to the image output from the imager sensor 113 (stabilizes the image) in accordance with the vibration detected by the gyro-sensor 112. More specifically, the image stabilization processing unit 115 performs processing of cutting out the area of the output image from the input image in a manner that an area smaller than the area of the input image provided from the imager sensor 113 is used as the area of the output image, and an object area included in the output image is fixed. Here, the image stabilization processing unit 115 may decide an area to be cut out in accordance with a result obtained by the gyro-sensor 112 detecting the vibration, or may decide an area to be cut out on the basis of the analyzation of the image.

The image stabilized by the image stabilization processing unit 115 is input into an image encode unit 122 of the encode and multiplexer module 120. In the present embodiment, the vector that is provided from the gyro-sensor 112 to the image stabilization processing unit 115 and indicates the vibration of the housing, or the vector corresponding to the image stabilization processing performed by the image stabilization processing unit 115 (e.g., the vector indicating the deviation of the position of the output image cut out from the input image from the center) is input into a stabilization vector encode unit 121 of the encode and multiplexer module 120. Each of the above-described vectors will also be referred to as stabilization vector. Furthermore, the audio data acquired by the microphone 114 and corresponding to the image is input into an audio encode unit 123 of the encode and multiplexer module 120.

Here, the above-described camera shaking correction (image stabilization) processing can be processing of removing at least part of the influence resulting from the shaking of the image shooting device at the time of image shooting. This processing allows the image stabilization processing unit 115 to output a stabilized image. In this case, the image is an image in which at least part of the influence resulting from the shaking of the image shooting device is removed. As discussed below, the image reverse stabilization module 160 adds an effect of expressing shaking to the image, thereby reproducing the shaking of the image shooting device in the image. The stabilization vector is an example of image shooting device shaking information indicating the shaking of the image shooting device occurring at the time of image shooting.

The encode and multiplexer module 120 includes the stabilization vector encode unit 121, the image encode unit 122, the audio encode unit 123, and a multiplexer 124. As described above, the respective encode units encode the image data, the audio data, and the stabilization vector provided from the signal capture and processing module 110. The multiplexer 124 multiplexes the data encoded by each encode unit. The multiplexed data is stored in a data storage 131 included in the memory module 130.

Figure 5:
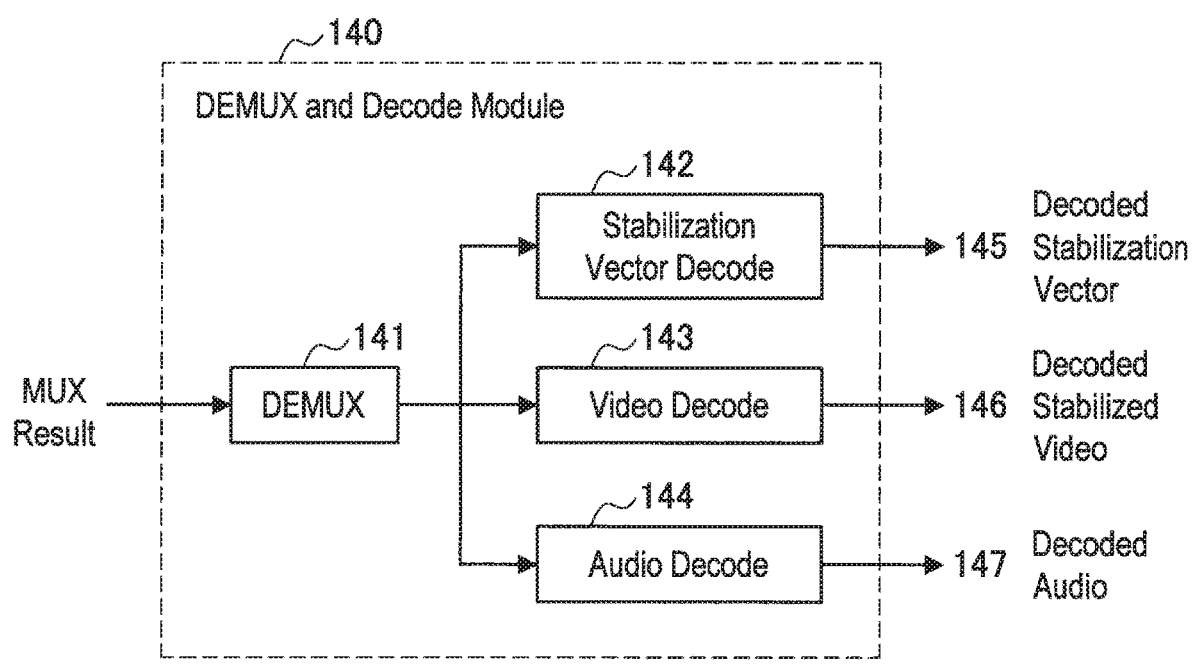
FIG. 5 is a block diagram illustrating a functional configuration of a demultiplexer and decode module included in the image processing system according to the first embodiment of the present disclosure in more detail.

FIG. 5 is a block diagram illustrating the functional configuration of a demultiplexer and decode module included in the image processing system according to the first embodiment of the present disclosure in more detail. FIG. 5 illustrates that the demultiplexer and decode module 140 includes a demultiplexer 141, a stabilization vector decode unit 142, an image decode unit 143, and an audio decode unit 144.

The demultiplexer 141 demultiplexes the data stored by the encode and multiplexer module 120 in the data storage 131 of the memory module 130, and acquires the data of the stabilization vector, the image data, and the audio data. The respective decode units decode the image data, audio data, stabilization vector encoded by the encode and multiplexer module 120. This offers a decoded stabilization vector 145, a decoded image (stabilized) 146, and a decoded audio 147.

Figure 6:
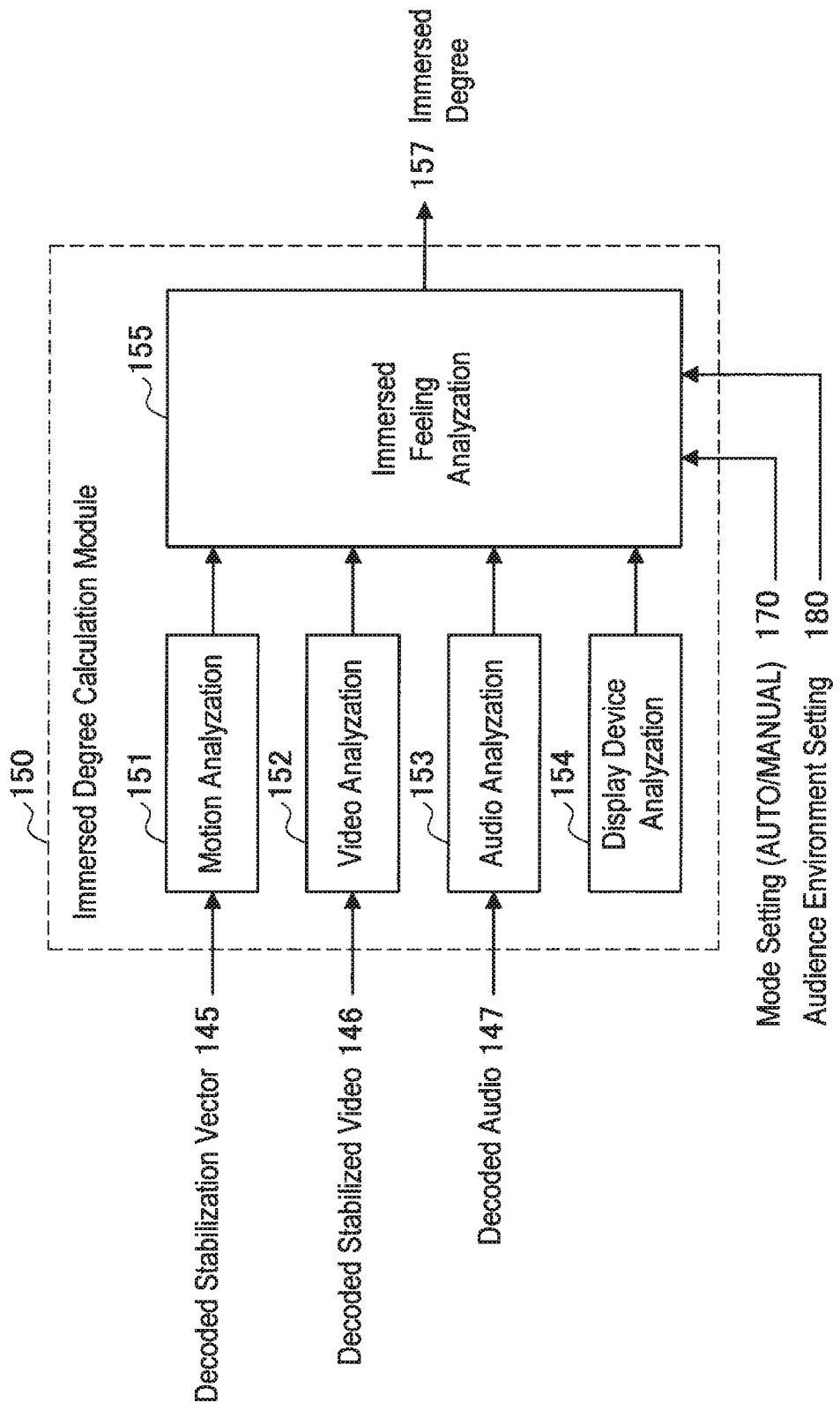
FIG. 6 is a block diagram illustrating a functional configuration of an immersed degree calculation module included in the image processing system according to the first embodiment of the present disclosure in more detail.

FIG. 6 is a block diagram illustrating the functional configuration of the immersed degree calculation module included in the image processing system according to the first embodiment of the present disclosure in more detail. FIG. 6 illustrates that the immersed degree calculation module 150 includes a motion analyzation unit 151, an image analyzation unit 152, an audio analyzation unit 153, a display device analyzation unit 154, and an immersed feeling analyzation unit 155.

The motion analyzation unit 151 executes analyzation based on the decoded stabilization vector 145. The image analyzation unit 152 executes analyzation based on the decoded image (stabilized) 146. The audio analyzation unit 153 executes analyzation based on the decoded audio 147. The display device analyzation unit 154 executes analyzation based on information that is separately acquired and pertains to a display device.

The immersed feeling analyzation unit 155 executes analyzation on the immersed feeling on the basis of a result of the analyzation executed by each analyzation unit. At this time, the immersed feeling analyzation unit 155 further uses the mode setting (auto/manual) 170, and the audience environment setting 180 as inputs. The immersed feeling analyzation unit 155 outputs an immersed degree 157 on the basis of a result of the analyzation. A specific example of the analyzation processing in the immersed feeling analyzation unit 155 will be discussed below.

Figure 7:
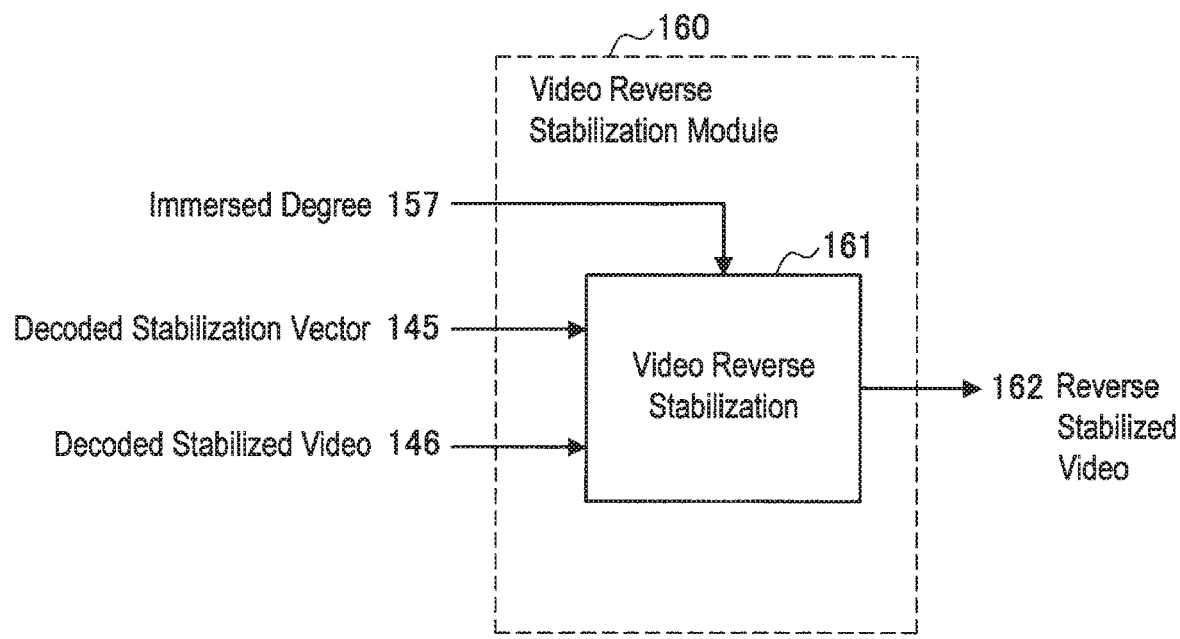
FIG. 7 is a block diagram illustrating a functional configuration of an image reverse stabilization module included in the image processing system according to the first embodiment of the present disclosure in more detail.

FIG. 7 is a block diagram illustrating the functional configuration of an image reverse stabilization module included in the image processing system according to the first embodiment of the present disclosure in more detail. FIG. 7 illustrates that the image reverse stabilization module 160 includes an image reverse stabilization unit 161. The image reverse stabilization unit 161 executes image reverse stabilization processing on the basis of the immersed degree 157. The image reverse stabilization unit 161 uses the decoded stabilization vector 145 and the decoded image (stabilized) 146 as inputs. The image reverse stabilization unit 161 outputs a reverse stabilized image 162.

Here, the image reverse stabilization module 160 is an example of an image reverse stabilization processing unit that adds an effect of expressing shaking to an image on the basis of shaking information on the shaking of the image. The shaking information is image shooting device shaking information indicating the shaking of the image shooting device occurring at the time of shooting an image. In other words, the shaking information can include the stabilization vector 145. As discussed below, the image reverse stabilization module 160 decides the degree of the above-described effect on the basis of the immersed degree 157 calculated by the immersed degree calculation module 150. In the present embodiment, the immersed degree 157 represents capturing environment information on the capturing environment of an image, or audience environment information on the audience environment of an image.

The image reverse stabilization module 160 can also be an example of an image reverse stabilization processing unit that decides the degree of the effect of expressing the shaking to be added to an image on the basis of the expectation value of the immersed feeling of an observer with respect to the image. In the present embodiment, the immersed degree 157 represents the expectation value of the immersed feeling. As discussed below, the immersed degree calculation module 150 decides the immersed degree 157 on the basis of capturing environment information indicating the capturing environment of an image, or audience environment information indicating the audience environment of an image.

Figure 8:
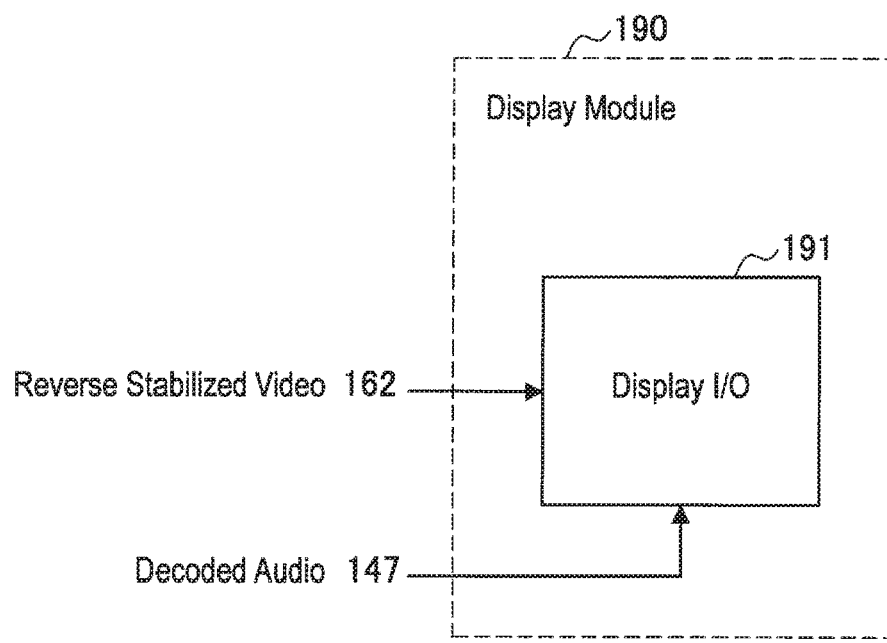
FIG. 8 is a block diagram illustrating a functional configuration of a display module included in the image processing system according to the first embodiment of the present disclosure in more detail.

FIG. 8 is a block diagram illustrating the functional configuration of a display module included in the image processing system according to the first embodiment of the present disclosure in more detail. FIG. 8 illustrates that the display module 190 includes a display I/O 191. The display I/O 191 displays an image and outputs an audio on the basis of the reverse stabilized image 162 and the decoded audio 147. Alternatively, the display I/O 191 transmits an image signal and an audio signal to an externally connected display device.

(1-4. Processing of Calculating Immersed Degree)

Figure 9:
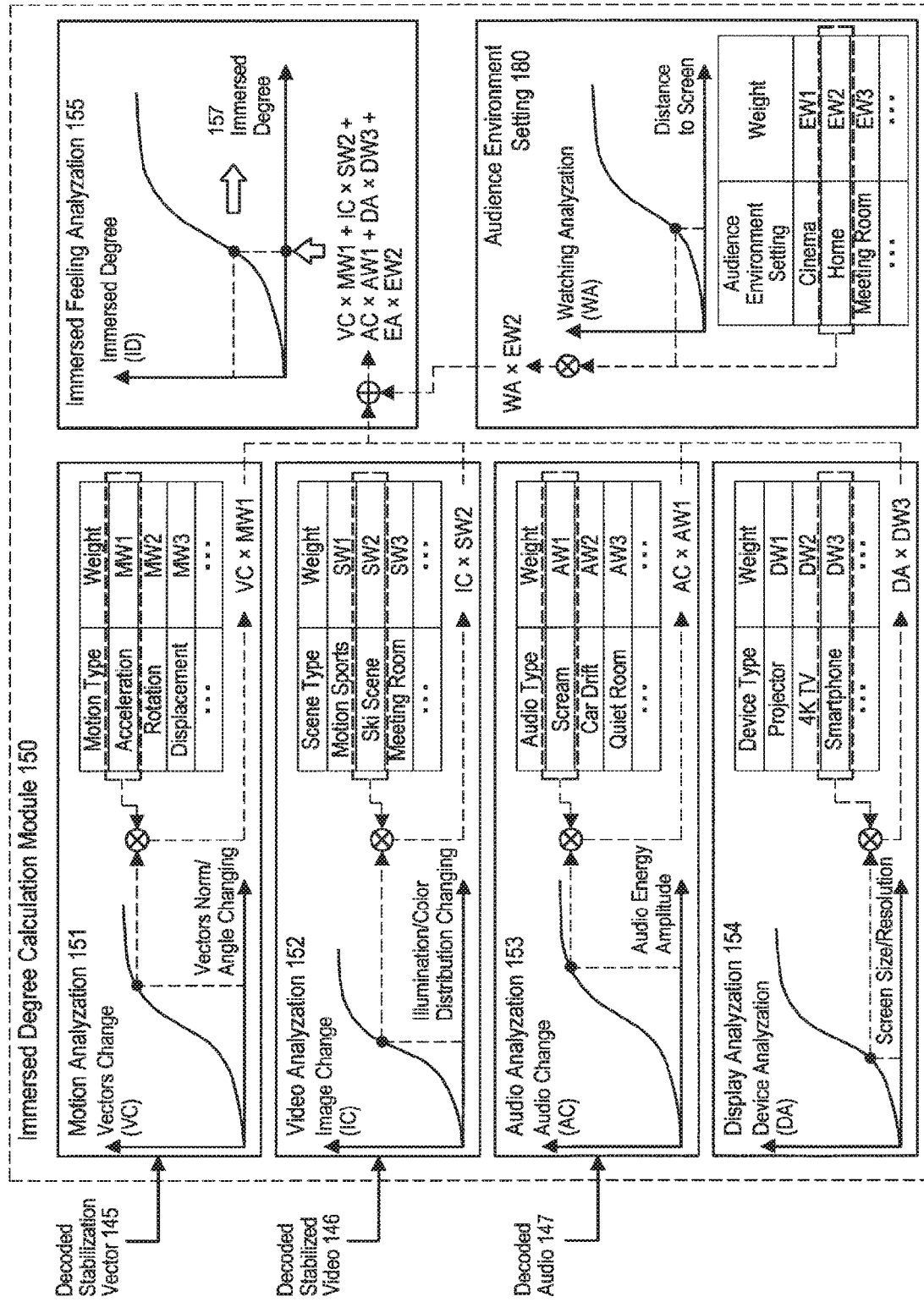
FIG. 9 is a diagram for further describing processing of calculating an immersed degree in the image processing system according to the first embodiment of the present disclosure.

FIG. 9 is a diagram for further describing processing of calculating an immersed degree in the image processing system according to the first embodiment of the present disclosure. The following describes analyzation using the motion analyzation unit 151, the image analyzation unit 152, the audio analyzation unit 153, the display device analyzation unit 154, the immersed feeling analyzation unit 155, and the audience environment setting 180 included in the immersed degree calculation module 150.

Here, the immersive degree is the expectation value of the immersive feeling of an observer with respect to a displayed image in the present specification. The immersive feeling may be paraphrased, for example, as impressiveness, a sense of realism, or the like. Images intended to make observers feel them more immersing (more impressive or realistic) thus have higher suitable immersed degrees for display. Immersed degrees suitable for displaying images can be calculated, for example, from the details of content, scenes, the color of images, and the like.

The motion analyzation unit 151 outputs a value for calculating the immersed degree in accordance with the direction or magnitude of the stabilization vector (the movement vector of a frame of an image) or the tendency thereof. That is to say, the capturing environment information represented by the immersed degree 157 in the present embodiment can include information on the movement vector of a frame of an image. The motion analyzation unit 151 uses a vector change amount (VC) and a weight for each motion type for analyzation. The vector change amount (VC) is a function for mapping a characteristic such as a change in the vector norm or a change in the angle extracted from the original stabilization vector to an output value. The weight (MW) for each motion type is defined in a table generated in advance. A motion type to be defined is decided, for example, on the basis of a result of motion analyzation. In the illustrated example, a weight MW1 is set for the motion of "acceleration." At this time, the motion analyzation unit 151 outputs the value of VC*MW1 on the basis of the output VC of the vector change amount and the weight MW1 for the motion type.

More specifically, the motion analyzation unit 151 may be set in a manner that, for example, a larger value (VC*MW) is output for greater motion. In this case, the vector change amount (VC) may be set in a manner that, for example, a larger value is output for greater motion, or a greater weight (MW) may be set for greater motion.

In addition, the motion analyzation unit 151 may be set in a manner that an output value (VC*MW) changes in accordance with a motion type such as vertical and horizontal movement or rotation. For example, the motion analyzation unit 151 may be set in a manner that a larger value (VC*MW) is output for vertical and horizontal movement to facilitate reverse stabilization, while the motion analyzation unit 151 may be set in a manner that a smaller value (VC*MW) is output for rotating motion to make reverse stabilization difficult (i.e., an image is stabilized).

The image analyzation unit 152 outputs a value for calculating the immersed degree in accordance with a characteristic indicated by an image. That is to say, the capturing environment information represented by the immersed degree 157 in the present embodiment can include an image characteristic indicated by an image. The image analyzation unit 152 uses an image change amount (IC) and a weight for each scene type for analyzation. The image change amount (IC) is a function for mapping a characteristic such as a change in the luminance or a change in the color distribution extracted from the original input image to an output value. That is to say, the image characteristic can include the luminance or color characteristic of an image in the present embodiment. In addition, the image characteristic may include a scene type. The weight (SW) for each scene type is defined in a table generated in advance. A scene type to be defined is decided, for example, on the basis of a result of scene analyzation. In the illustrated example, a weight SW2 is set for the scene of "ski." At this time, the image analyzation unit 152 outputs the value of IC*SW2 on the basis of the output IC of the image change amount and the weight SW2 for the scene type.

More specifically, the image analyzation unit 152 may be set in a manner that, for example, a larger value (IC*SW) is output for a scene such as sports or ski to facilitate reverse stabilization. In this case, the image change amount (IC)

may be set in a manner that, for example, a change in the luminance or color distribution of the above-described scene is considerably reflected, or a greater weight (SW) may be set for the above-described scene type.

The image analyzation unit 152 may be set in a manner that a larger value (IC*SW) is output to facilitate reverse stabilization when the color distribution considerably changes. Meanwhile, the image analyzation unit 152 may be set in a manner that a smaller value (IC*SW) is output to make reverse stabilization difficult when the color distribution experiences few changes. This is because a change in the color distribution is supposed to indicate how drastically the screen changes. For example, an image shot in a meeting room, where the screen experiences few changes, has a small change in the color distribution. Meanwhile, an image shot in a place such as a roller coaster, where the screen drastically changes, has a great change in the color distribution.

The audio analyzation unit 153 outputs a value for calculating the immersed degree in accordance with a characteristic indicated by the audio accompanying an image. That is to say, the capturing environment information represented by the immersed degree 157 in the present embodiment can include an audio characteristic indicated by the audio accompanying an image. The audio analyzation unit 153 uses an audio change amount (AC) and a weight for each audio type for analyzation. The audio change amount (AC) is a function for mapping a characteristic such as a change in the high frequency component energy of the audio or the amplitude of the audio extracted from the original input audio to an output value. That is to say, the audio characteristic can include the frequency component of an audio, the amplitude of an audio, or an audio type indicated by an audio in the present embodiment. The weight (AW) for each audio type is defined in a table generated in advance. An audio type to be defined is decided, for example, on the basis of a result of audio analyzation. In the illustrated example, a weight AW1 is set for the scene of "scream." At this time, the audio analyzation unit 153 outputs the value of AC*AW1 on the basis of the output AC of the audio change amount and the weight AW1 for the audio type.

More specifically, the audio analyzation unit 153 may be set in a manner that, for example, a larger value (AC*AW) is output to facilitate reverse stabilization when a noisy audio such as a motor sound and a drift sound is acquired. In this case, the audio change amount (AC) may be set in a manner that, for example, a change in the frequency component or amplitude of the audio is considerably reflected, or a greater weight (AW) may be set for the above-described audio type. Meanwhile, the audio analyzation unit 153 may be set in a manner that a smaller value (AC*AW) is output to make reverse stabilization difficult (i.e., an image is stabilized) when an audio indicating a quiet environment is acquired.

The display device analyzation unit 154 uses a device analyzation amount (DA) and a weight for each device type for analyzation. The device analyzation amount (DA) is a function for mapping, for example, the size or resolution of the screen of a display device to an output value. That is to say, the audience environment information represented by the immersed degree 157 in the present embodiment can include the size of a screen on which an image is displayed. The size or resolution of the screen of a display device can be acquired, for example, from information indicating the operation status of the monitor or projector built in the device or information acquired via an external monitor interface. The weight (DW) for each device type is defined in a table generated in advance. In the illustrated example, a weight DW3 is set for the scene of "smartphone." At this time, the display device analyzation unit 154 outputs the value of DC*DW3 on the basis of the output value DA of the device analyzation amount and the weight DW3 for the device type.

More specifically, the display device analyzation unit 154 may be set in a manner that a smaller value (DA*DW) is output for a screen having a larger size and/or a higher resolution to make reverse stabilization difficult. Meanwhile, the display device analyzation unit 154 may be set in a manner that a larger value (DA*DW) is output for a screen having a smaller size and/or a lower resolution to facilitate reverse stabilization. This is because when the size of a screen is large or the resolution is high, it is frequently more useful to reduce a burden (such as visually induced motion sickness) on an observer by stabilizing an image rather than to make an image realistic.

A watching analyzation amount (WA) and a weight for each audience environment setting are used for analyzation using the audience environment setting 180. The watching analyzation amount (WA) is a function for mapping, for example, the distance from an observer to the screen to an output value. That is to say, the audience environment information represented by the immersed degree 157 in the present embodiment can include the distance from an observer to a screen on which an image is displayed. The weight (EW) for each audience environment setting is defined in a table generated in advance. The table can be generated, for example, on the basis of a setting operation of a user. In the illustrated example, a weight EW2 is set for the audience environment setting of "home." In the analyzation using the audience environment setting 180, the value of WA*EW2 is then output on the basis of the output value WA of the watching analyzation amount and the weight EW2 for each audience environment setting.

More specifically, the analyzation using the audience environment setting 180 may be set in a manner that a smaller value (WA*EW) is output to make reverse stabilization difficult as an observer has a shorter distance to the screen. Meanwhile, the analyzation using the audience environment setting 180 may be set in a manner that a larger value (WA*EW) is output to facilitate reverse stabilization as an observer has a longer distance to the screen. This is because when an observer is close to the screen, it is frequently more useful to reduce a burden (such as visually induced motion sickness) on an observer by stabilizing an image rather than to make an image realistic.

The immersed feeling analyzation unit 155 combines results of the analyzation using the motion analyzation unit 151, the image analyzation unit 152, the audio analyzation unit 153, the display device analyzation unit 154, and the audience environment setting 180. The combination can be made by adding the output values weighted as VC*MW1+IC*SW2+AC*AW1+DA*DW3+EA*EW2, for example, like the illustrated example. Furthermore, an immersed degree function (ID) maps the combined result to the output value of the immersed degree 157. The immersed degree 157 is used in the image reverse stabilization module 160 for controlling the reverse stabilization of an image.

Here, as illustrated, the immersed degree 157 can be output as a continuous value. The image reverse stabilization module 160 may decide to what degree the shaking of an image shooting device at the time of image shooting is reproduced in an image to be reproduced (the degree of the effect of expressing the shaking in an image) by reverse stabilization using a stabilization vector, for example, in accordance with the value of the immersed degree 157. In this case, the image reverse stabilization module 160 may decide whether to reproduce the shaking of the image shooting device at the time of image shooting in an image to be reproduced (whether to add the effect of expressing the shaking to an image) by reverse stabilization using a stabilization vector, on the basis of whether the immersed degree 157 exceeds a predetermined threshold. As described above, in the present embodiment, the immersed degree 157 represents capturing environment information on the capturing environment of an image, or audience environment information on the audience environment of an image. It can also be thus said that the above-described decision made by the image reverse stabilization module 160 is based on the capturing environment information or the audience environment information.

(1-5. Display Example)

Figure 10:
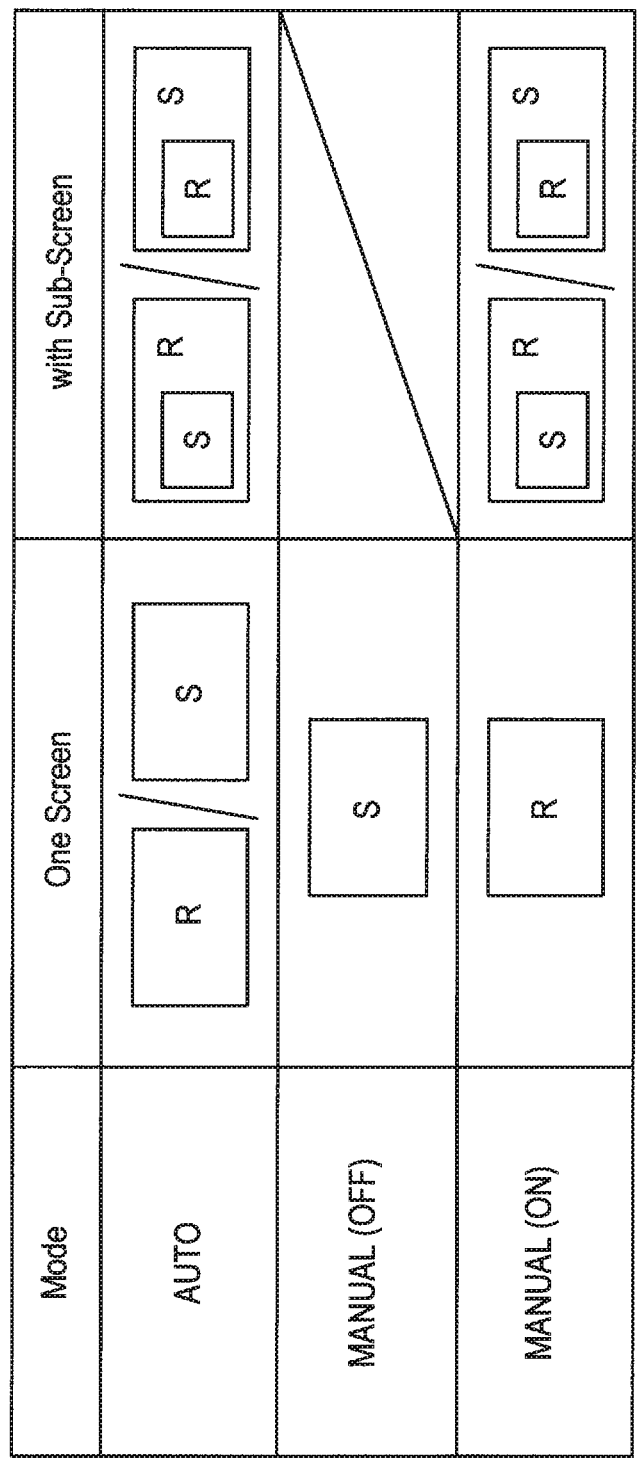
FIG. 10 is a diagram illustrating a first example of image display in the first embodiment of the present disclosure.

FIG. 10 is a diagram illustrating a first example of image display in the first embodiment of the present disclosure. The example illustrated in FIG. 10 shows display examples of single screens and screens with sub-screens with the mode setting 170 set as auto, manual (OFF), and manual (ON). In the figure, "R" represents a reverse stabilized image, and "S" represents a stabilized image (not reverse stabilized).

If the mode setting 170 is set as auto, any of a reverse stabilized image and a stabilized image is displayed for a single screen, for example, on the basis of the immersed degree 157 calculated in the above-described processing of the immersed degree calculation module 150. Meanwhile, in the case of a screen with a sub-screen, it is selected to display a reverse stabilized image on the main screen, and a stabilized image on the sub-screen in accordance with the immersed degree 157, or conversely, to display a stabilized image on the main screen, and a reverse stabilized image on the sub-screen.

Here, if the immersed degree 157 is greater than a predetermined threshold with the mode setting 170 set as auto, a reverse stabilized image can be displayed on a single screen, and a reverse stabilized image can be displayed on the main screen of a screen with a sub-screen. Meanwhile, if the immersed degree 157 is not greater than the predetermined threshold, a stabilized image can be displayed on a single screen, and a reverse stabilized image can be displayed on the sub-screen of a screen with a sub-screen.

Meanwhile, if the mode setting 170 is set as manual (OFF), a stabilized image (not reverse stabilized) is displayed on a single screen irrespective of the immersed degree 157. In this case, the immersed degree calculation module 150 does not have to execute processing of calculating the immersed degree 157.

If the mode setting 170 set as manual (ON), a reverse stabilized image can be displayed, irrespective of the immersed degree 157, on a single screen, and a reverse stabilized image can be displayed on the main screen of a screen with a sub-screen. In this case, the immersed degree calculation module 150 does not have to execute processing of calculating the immersed degree 157. In this example, a manual operation may switch displaying a reverse stabilized image on the main screen, and a stabilized image on the sub-screen, and conversely displaying a stabilized image on the main screen, and a reverse stabilized image on the sub-screen.

Figure 11:
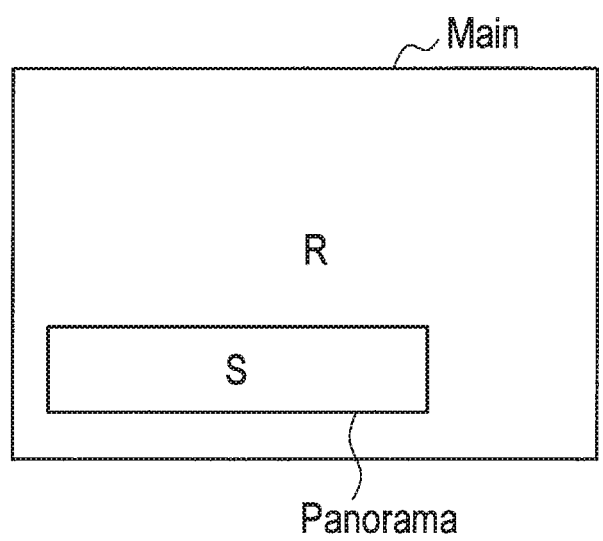
FIG. 11 is a diagram illustrating a second example of image display in the first embodiment of the present disclosure.

FIG. 11 is a diagram illustrating a second example of image display in the first embodiment of the present disclosure. In the example illustrated in FIG. 11, a reverse stabilized image is displayed on the main screen (Main) of a screen on which a panoramic image is displayed as the sub-screen, and a stabilized image (not reverse stabilized) is displayed on the sub-screen (Panorama) on which a panoramic image is displayed. Here, panoramic images are frequently used, for example, to look down on wide areas. Accordingly, the sub-screen may be set to display a stabilized image irrespective of the immersed degree 157 like the illustrated example.

2. Second Embodiment

Figure 12:
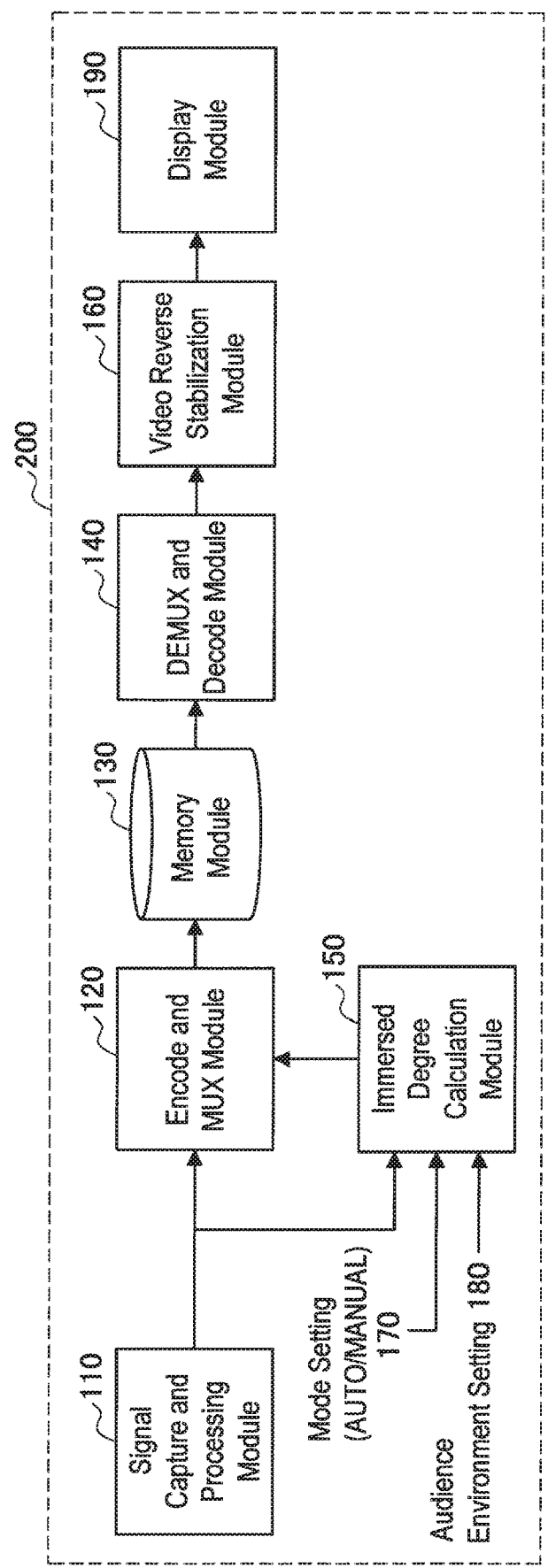
FIG. 12 is a schematic block diagram illustrating a functional configuration example of an image processing system according to a second embodiment of the present disclosure.

FIG. 12 is a schematic block diagram illustrating the functional configuration example of an image processing system according to a second embodiment of the present disclosure. FIG. 12 illustrates that an image processing system 200 includes the signal capture and processing module 110, the encode and multiplexer module 120, the memory module 130, the demultiplexer and decode module 140, the immersed degree calculation module 150, the image reverse stabilization module 160, and the display module 190. The immersed degree calculation module 150 receives the mode setting 170 and the audience environment setting 180.

The image processing system 200 according to the present embodiment includes the similar components to those of the first embodiment, but has the components differently disposed. In the present embodiment, an image, an audio, and a stabilization vector acquired by the signal capture and processing module 110 are input to the encode and multiplexer module 120, and also input to the immersed degree calculation module 150. The immersed degree calculated by the immersed degree calculation module 150 is encoded and multiplexed in the encode and multiplexer module 120 along with the image, the audio, and the stabilization vector, and stored in the memory module 130.

The demultiplexer and decode module 140, which reads out data from the memory module 130, demultiplexes and decodes the data, thereby obtaining the immersed degree along with the image, the audio, and the stabilization vector. The image, the audio, the stabilization vector, and the immersed degree are input to the image reverse stabilization module 160, and reverse stabilization according to the immersed degree of the image is executed in the image reverse stabilization module 160. The image and audio processed by the image reverse stabilization module 160 are output by the display module 190.

In the present embodiment, the immersed degree has been already calculated before a recorded image is stored in the memory module 130 as data. Accordingly, it is possible to reverse stabilize the image without image analyzation at the time of reproduction. Such a configuration is effective, for example, when a device that executes reproduction processing does not have a high processing capability, and a device that executes recording processing has a sufficient processing capability. For example, if the mode setting 170 and the audience environment setting 180 are differently set at the time of reproduction from at the time of recording, part of the processing of the immersed degree calculation module 150 may be executed again at the time of reproduction to update the immersed degree.

Figure 13:
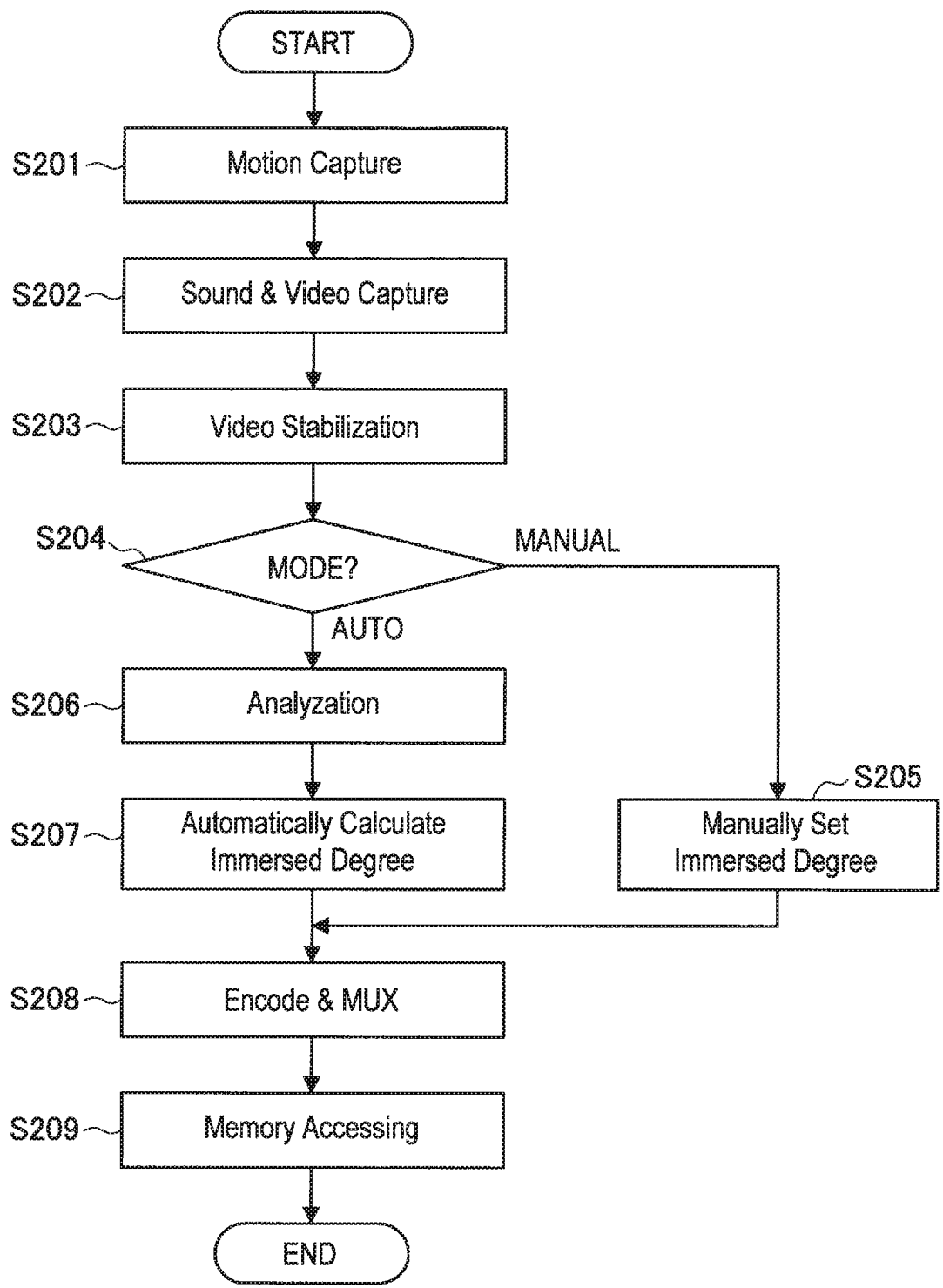
FIG. 13 is a flowchart illustrating an example of recording processing in the second embodiment of the present disclosure.

FIG. 13 is a flowchart illustrating an example of recording processing in the second embodiment of the present disclosure. FIG. 13 illustrates that the signal capture and processing module 110 first captures the motion of an image shooting device (S201), and captures an audio and an image (S202). Furthermore, the signal capture and processing module 110 stabilizes the image in accordance with the motion acquired in S201 (S203).

In the present embodiment, the immersed degree of the image is here decided. The immersed degree calculation module 150 determines a mode on the basis of the mode setting 170 (S204). If the mode is "manual," the immersed degree calculation module 150 manually sets the immersed degree (S205). The value of the immersed degree set here can be, for example, a value input through a user operation. Meanwhile, if the determination in S204 shows that the mode is "auto," the immersed degree calculation module 150 analyzes the image (S206) and automatically calculates the immersed degree (S207).

The encode and multiplexer module 120 encodes and multiplexes the image, the audio, the stabilization vector, and the immersed degree on the basis of the immersed degree automatically calculated by the immersed degree calculation module 150 in S207 or the immersed degree manually set by the immersed degree calculation module 150 in S205 (S208). Memory accessing (S209) then causes the multiplexed data to be stored in the memory module 130.

Figure 14:
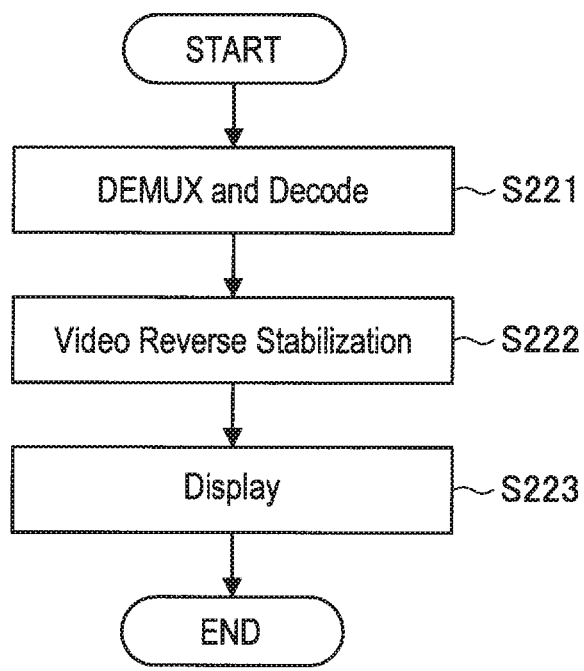
FIG. 14 is a flowchart illustrating an example of reproduction processing in the second embodiment of the present disclosure.

FIG. 14 is a flowchart illustrating an example of reproduction processing in the second embodiment of the present disclosure. FIG. 14 illustrates that the demultiplexer and decode module 140 first demultiplexes and decodes the data of the image and audio read out from the memory module 130 (S221). At this time, the data of the stabilization vector and immersed degree stored in the memory module 130 along with the data of the image and audio is read out, and decoded and demultiplexed.

Next, the image reverse stabilization module 160 reverse stabilizes the image on the basis of the decoded stabilization vector and the decoded immersed degree (S222). Furthermore, the display module 190 displays the reverse stabilized image (S223).

3. Third Embodiment

Figure 15:
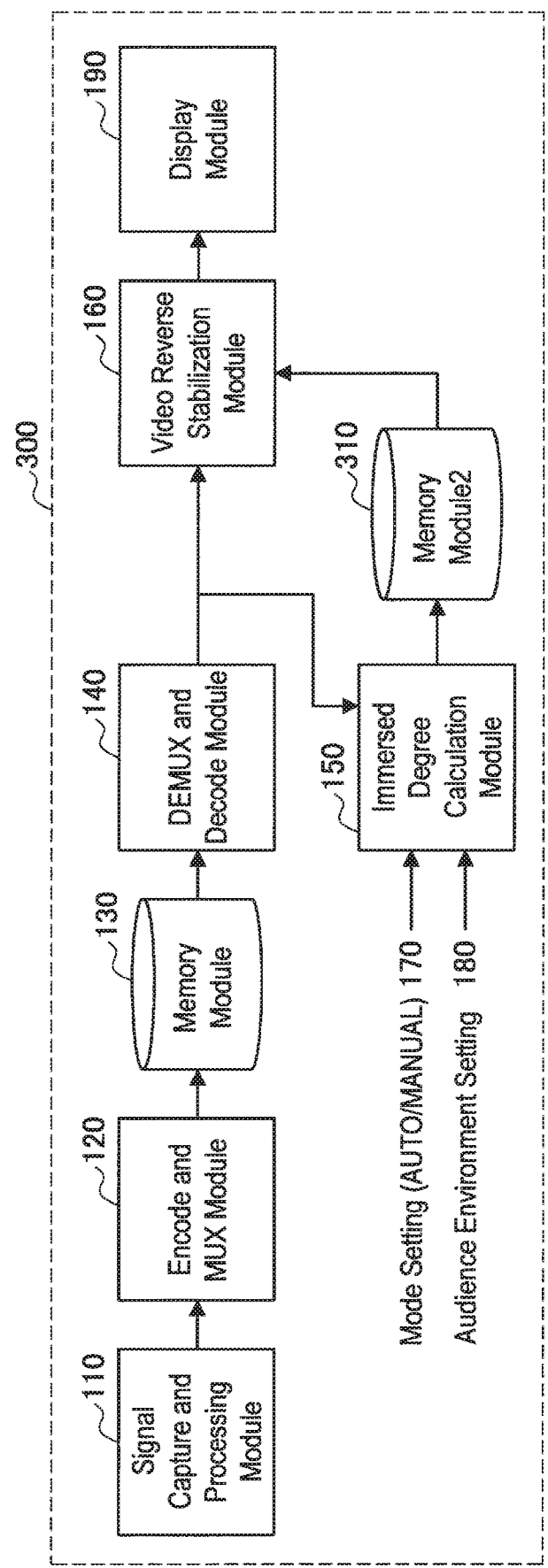
FIG. 15 is a schematic block diagram illustrating a functional configuration example of an image processing system according to a third embodiment of the present disclosure.

FIG. 15 is a schematic block diagram illustrating the functional configuration example of an image processing system according to a third embodiment of the present disclosure. FIG. 15 illustrates that an image processing system 300 includes the signal capture and processing module 110, the encode and multiplexer module 120, the memory module 130, the demultiplexer and decode module 140, the immersed degree calculation module 150, the image reverse stabilization module 160, and the display module 190. The immersed degree calculation module 150 receives the mode setting 170 and the audience environment setting 180. In addition, the image processing system 300 further includes a second memory module 310.

The image processing system 300 according to the present embodiment is similar to that of the above-described first embodiment in that the immersed degree calculation module 150 calculates an immersed degree on the basis of the image, audio, and stabilization vector that are read out from the memory module 130, and demultiplexed and decoded by the demultiplexer and decode module 140. However, in the present embodiment, the immersed degree calculated by the immersed degree calculation module 150 is stored in the second memory module 310. The image reverse stabilization module 160 executes reverse stabilization processing on the basis of the image, audio, and stabilization vector that are decoded by the demultiplexer and decode module 140, and the immersed degree that is read out from the second memory module 310.

In the present embodiment, the immersed degree calculated by the immersed degree calculation module 150 is temporarily stored in the memory module 310. Accordingly, it is possible to execute processing of calculating the immersed degree before reproducing the image. It is thus possible to reverse stabilize an image, for example, with no image analyzation at the time of reproduction as long as the immersed degree is calculated through batch processing before a recorded image is reproduced. Such a configuration is effective, for example, when none of a device that executes recording processing and a device that executes reproduction processing have a high processing capability, and processing of calculating the immersed degree is requested from a server.

Even if a device that executes recording processing and a device that executes reproduction processing have a sufficient processing capability, requesting processing of calculating the immersed degree from a server can save, for example, the battery of a mobile device or a wearable device. In that case, the configuration according to the present embodiment can be effective.

4. Hardware Configuration

Figure 16:
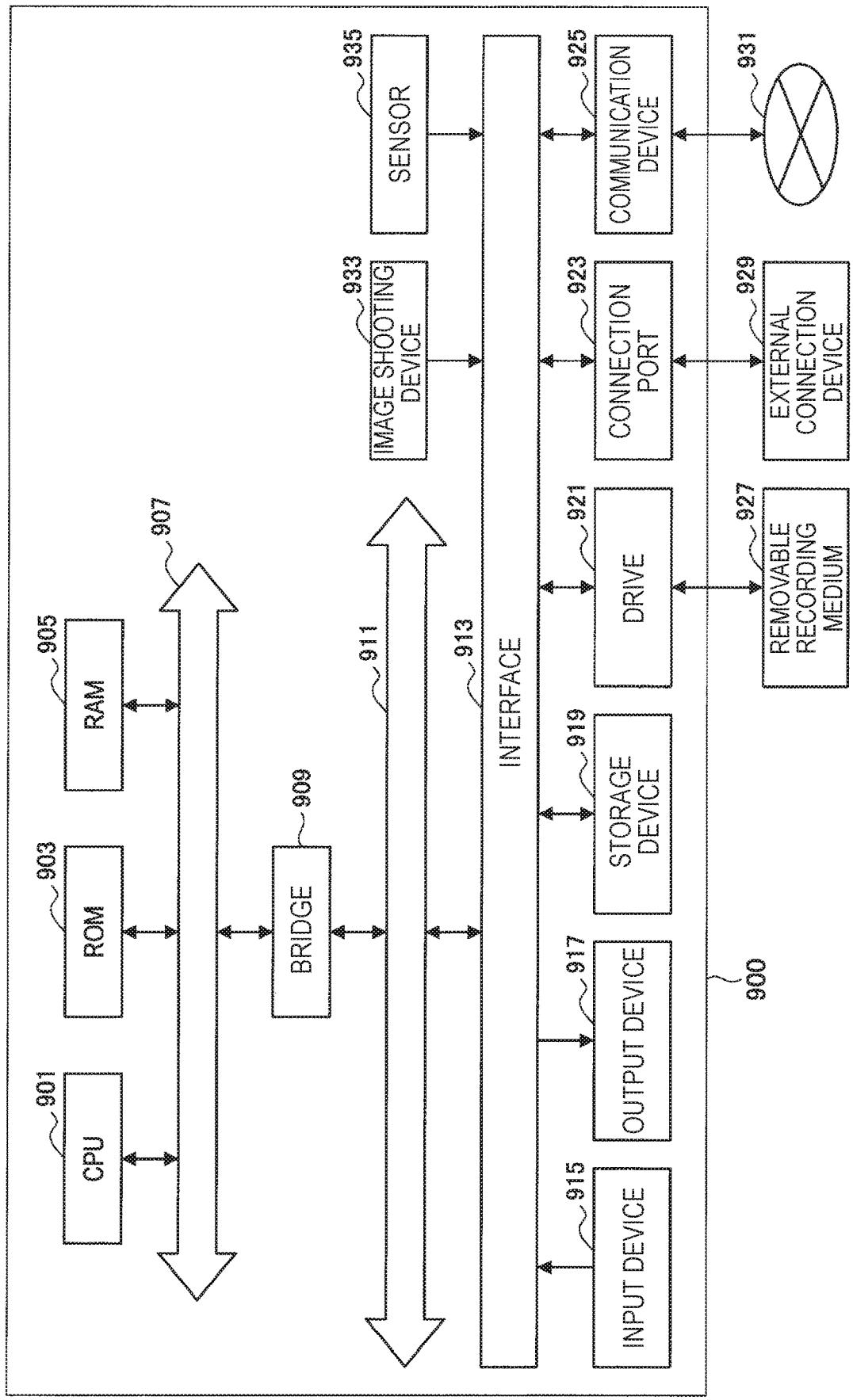
FIG. 16 is a block diagram illustrating a hardware configuration example of an image processing device according to an embodiment of the present disclosure.

Next, the hardware configuration of an image processing device according to an embodiment of the present disclosure will be described with reference to FIG. 16. FIG. 16 is a block diagram illustrating a hardware configuration example of an image processing device according to an embodiment of the present disclosure. An illustrated image processing device 900 can implement, for example, a terminal device and/or server device in the above-described embodiment.

The image processing device 900 includes a central processing unit (CPU) 901, a read only memory (ROM) 903, and a random access memory (RAM) 905. In addition, the image processing device 900 may include a host bus 907, a bridge 909, an external bus 911, an interface 913, an input device 915, an output device 917, a storage device 919, a drive 921, a connection port 923, and a communication device 925. Further, the image processing device 900 may include an image shooting device 933 and a sensor 935 as necessary. The image processing device 900 may include a processing circuit referred to as digital signal processor (DSP) or application specific integrated circuit (ASIC) instead of or along with the CPU 901.

The CPU 901 functions as an operation processor and a controller, and controls all or some operations in the image processing device 900 in accordance with a variety of programs recorded on the ROM 903, the RAM 905, the storage device 919, or a removable recording medium 927. The ROM 903 stores a program, an operation parameter, and the like which are used by the CPU 901. The RAM 905 primarily stores a program which is used in the execution of the CPU 901 and a parameter which is appropriately modified in the execution. The CPU 901, the ROM 903, and the RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is a device which is operated by a user, such as a mouse, a keyboard, a touch panel, a button, a switch, and a lever. The input device 915 may be, for example, a remote control device using infrared light or other radio waves, or may be an external connection device 929 such as a mobile phone operable in response to the operation of the image processing device 900. The input device 915 includes an input control circuit which generates an input signal on the basis of information input by a user and outputs the input signal to the CPU 901. By operating the input device 915, a user inputs various types of data to the image processing device 900 or requires a processing operation.

The output device 917 includes a device capable of visually or audibly notifying the user of acquired information. The output device 917 may include a display device such as a liquid crystal display (LCD), a plasma display panel (PDP) and an organic electro-luminescence (EL) display, an audio output device such as a speaker and a headphone, and a printer. The output device 917 may output a result obtained from the processing of the image processing device 900 in a form of an image such as text and an image, and an audio such as an audio and acoustics.

The storage device 919 is a device for data storage which is configured as an example of a storage unit of the image processing device 900. The storage device 919 includes, for example, a magnetic storage device such as a hard disk drive (HDD), a semiconductor storage device, an optical storage device, or a magneto-optical storage device. The storage device 919 stores a program to be executed by the CPU 901, various types of data, various types of data acquired from the outside, and the like.

The drive 921 is a reader/writer for the removable recording medium 927 such as a magnetic disk, an optical disc, a magneto-optical disk, and a semiconductor memory, and is built in the image processing device 900 or externally attached thereto. The drive 921 reads out information recorded in the removable recording medium 927 attached thereto, and outputs the read-out information to the RAM 905. In addition, the drive 921 writes record into the mounted removable recording medium 927.

The connection port 923 is a port used to directly connect a device to the image processing device 900. The connection port 923 may include, for example, a universal serial bus (USB) port, an IEEE1394 port, and a small computer system interface (SCSI) port. The connection port 923 may further include an RS-232C port, an optical audio terminal, a high-definition multimedia interface (HDMI) (registered trademark) port, and so on. The connection of the external connection device 929 to the connection port 923 makes it possible to exchange various types of data between the image processing device 900 and the external connection device 929.

The communication device 925 is, for example, a communication interface including a communication device or the like for a connection to a communication network 931. The communication device 925 may be, for example, a communication card for a wired or wireless local area network (LAN), Bluetooth (registered trademark), a wireless USB (WUSB) or the like. In addition, the communication device 925 may be a router for optical communication, a router for an asymmetric digital subscriber line (ADSL), a modem for various kinds of communication, or the like. The communication device 925 transmits a signal to and receives a signal from, for example, the Internet or other communication devices on the basis of a predetermined protocol such as TCP/IP. In addition, the communication network 931 connected to the communication device 925 may be a network connected in a wired or wireless manner, and is, for example, the Internet, a home LAN, infrared communication, radio wave communication, satellite communication, or the like.

The image shooting device 933 is a device that generates a shot image by shooting an image of real space using an image sensor such as a charge coupled device (CCD) or complementary metal oxide semiconductor (CMOS), as well as various members such as a lens for controlling the formation of an object image on the image sensor, for example. The image shooting device 933 may be a device that shoots a still image, and may also be a device that shoots a moving image.

The sensor 935 includes various sensors such as an acceleration sensor, a gyro sensor, a geomagnetic sensor, an optical sensor, and a sound sensor, for example. The sensor 935 acquires information on the state of the image processing device 900, such as the posture of the housing of the image processing device 900, and information on an environment around the image processing device 900, such as the brightness and noise around the image processing device 900. The sensor 935 may also include a global positioning system (GPS) sensor that receives GPS signals and measures the latitude, longitude, and altitude of the device.

The example of the hardware configuration of the image processing device 900 has been described so far. Each of the above-described components may be configured with a general-purpose member, and may also be configured with hardware specialized in the function of each component. Such a configuration may also be modified as appropriate in accordance with the technological level at the time of the implementation.

5. Supplemental Information

The embodiments of the present disclosure may include, for example, an image processing device (a terminal device or a server device) as described above, a system, an information processing method executed by the image processing device or the system, a program for causing the image processing device to function, and a non-transitory tangible medium having the program recorded thereon.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An image processing device including:

an image reverse stabilization processing unit configured to add an effect of expressing shaking to an image on the basis of shaking information on shaking of the image.

(2)

The image processing device according to (1), wherein the shaking information includes image shooting device shaking information indicating shaking of an image shooting device occurring at a time of shooting the image.

(3)
The image processing device according to (1) or (2), wherein
the image reverse stabilization processing unit decides a degree of the effect on the basis of capturing environment information on a capturing environment of the image.
(4)
The image processing device according to (3), wherein
the image reverse stabilization processing unit decides a degree to which the effect is added, on the basis of the capturing environment information.
(5)
The image processing device according to (4), wherein
the image reverse stabilization processing unit decides whether to add the effect, as the degree to which the effect is added.
(6)
The image processing device according to any one of (3) to (5), wherein
the capturing environment information includes information on a movement vector of a frame of the image.
(7)
The image processing device according to any one of (3) to (6), wherein
the capturing environment information includes an image characteristic indicated by the image.
(8)
The image processing device according to (7), wherein
the image characteristic includes a luminance or color characteristic of the image.
(9)
The image processing device according to (7) or (8) wherein
the image characteristic includes a scene type.
(10)
The image processing device according to any one of (3) to (9), wherein
the capturing environment information includes an audio characteristic indicated by an audio accompanying the image.
(11)
The image processing device according to (10), wherein
the audio characteristic includes a frequency component of the audio, an amplitude of the audio, or an audio type indicated by the audio.
(12)
The image processing device according to any one of (1) to (11), wherein
the image reverse stabilization processing unit decides a degree of the effect on the basis of audience environment information on an audience environment of the image.
(13)
The image processing device according to (12), wherein
the audience environment information includes a size of a screen on which the image is displayed.
(14)
The image processing device according to (12) or (13), wherein
the audience environment information includes a distance from an observer to a screen on which the image is displayed.
(15)
The image processing device according to any one of (1) to (14), wherein
the image is an image in which at least part of influence resulting from shaking of an image shooting device is removed, and the image reverse stabilization processing unit adds the effect to the image to reproduce the shaking of the image shooting device in the image.
(16)
An image processing device including:
an image reverse stabilization processing unit configured to decide a degree of an effect of expressing shaking to be added to an image, on the basis of an expectation value of an immersed feeling of an observer with respect to the image.
(17)
The image processing device according to (16), wherein
the expectation value of the immersed feeling is decided on the basis of capturing environment information indicating a capturing environment of the image.
(18)
The image processing device according to (17), wherein
the capturing environment information includes an image characteristic indicated by the image.
(19)
The image processing device according to (17) or (18), wherein
the capturing environment information includes an audio characteristic indicated by an audio accompanying the image.
(20)
The image processing device according to any one of (16) to (19), wherein
the expectation value of the immersed feeling is decided on the basis of audience environment information indicating an audience environment of the image.
(21)
The image processing device according to (20), wherein
the audience environment information includes a size of a screen on which the image is displayed.
(22)
The image processing device according to (21), wherein
the audience environment information includes a distance from an observer to a screen on which the image is displayed.
(23)
The image processing device according to any one of (16) to (22), wherein
the image reverse stabilization processing unit adds the effect on the basis of shaking information on shaking of the image.
(24)
An image processing method including:
adding, by a processor, an effect of expressing shaking to an image on the basis of shaking information on shaking of the image.
(25)
An image processing method including:
deciding, by a processor, a degree of an effect of expressing shaking to be added to an image, on the basis of an expectation value of an immersed feeling of an observer with respect to the image.
(26)
A program for causing a computer to execute:
a function of adding an effect of expressing shaking to an image on the basis of shaking information on shaking of the image.
(27)
A program for causing a computer to execute:
a function of deciding a degree of an effect of expressing shaking to be added to an image, on the basis of an expectation value of an immersed feeling of an observer with respect to the image.

(28) An image processing device including:
an image reverse stabilization processing unit configured to add an effect of expressing shaking of an image on the basis of capturing environment information on a capturing environment of the image.

(29) An image processing device including:
an image reverse stabilization processing unit configured to add an effect of expressing shaking of an image on the basis of audience environment information on an audience environment of the image.

REFERENCE SIGNS LIST 100, 200, 300 image processing system
110 signal capture and processing module
120 encode and multiplexer module
130 memory module
140 demultiplexer and decode module
150 immersed degree calculation module
160 image reverse stabilization module
190 display module
310 second memory module

The invention claimed is:

1. An image shooting apparatus comprising:
an image sensor configured to capture a moving image; and
circuitry configured to associate a stabilization information to the moving image in a case where a stabilization process has been applied to the moving image to produce a stabilized image, and to generate a reverse-stabilized image based on the stabilization information and the stabilized image,
wherein the reverse-stabilized image has a larger degree of movement than the stabilized image.

2. The image shooting apparatus according to claim 1, wherein the stabilization process is an optical camera shaking correction.

3. The image shooting apparatus according to claim 1, wherein the stabilization process is applied to the moving image by signal processing circuitry.

4. The image shooting apparatus according to claim 1, wherein the stabilization information represents a movement vector.

5. The image shooting apparatus according to claim 1, wherein the circuitry is configured to associate an immersed degree to the moving image.

6. The image shooting apparatus according to claim 1, wherein the reverse-stabilized image includes a shaking effect.

7. The image shooting apparatus according to claim 1, further comprising a memory configured to store at least one of the stabilization information or the moving image.

8. The image shooting apparatus according to claim 1, wherein the image sensor is a CCD device or a CMOS device.

9. An image shooting method comprising:
capturing, by an image sensor, a moving image;
associating, by circuitry, a stabilization information to the moving image in a case where a stabilization process has been applied to the moving image to produce a stabilized image; and
generating, by the circuitry, a reverse-stabilized image based on the stabilization information and the stabilized image,
wherein the reverse-stabilized image has a larger degree of movement than the stabilized image.

10. The image shooting method according to claim 9, wherein the stabilization process is an optical camera shaking correction.

11. The image shooting method according to claim 9, wherein the stabilization process is applied to the moving image by signal processing circuitry.

12. The image shooting method according to claim 9, wherein the stabilization information represents a movement vector.

13. The image shooting method according to claim 9, further comprising:
associating, by the circuitry, an immersed degree to the moving image.

14. The image shooting method according to claim 9, wherein the reverse-stabilized image includes a shaking effect.

15. The image shooting method according to claim 9, further comprising:
storing, by a memory, at least one of the stabilization information or the moving image.

16. A non-transitory computer-readable medium storing instructions that, when executed by a processor associated with an image shooting device, cause the image shooting device to perform operations comprising:
capturing, by an image sensor of the image shooting device, a moving image;
associating, by circuitry of the image shooting device, a stabilization information to the moving image in a case where a stabilization process has been applied to the moving image to produce a stabilized image; and
generating, by the circuitry, a reverse-stabilized image based on the stabilization information and the moving image,
wherein the reverse-stabilized image has a larger degree of movement than the stabilized image.

* * * * *